(12) United States Patent
Ho

(10) Patent No.: US 6,485,165 B1
(45) Date of Patent: Nov. 26, 2002

(54) TERRESTRIAL GLOBE

(76) Inventor: Peng-An Ho, 122-5, Jun Liao Rd., Feng Yuan, Taichung Hsien (TW)

( * ) Notice: Subject to any disclaimer, the term of this patent is extended or adjusted under 35 U.S.C. 154(b) by 0 days.

(21) Appl. No.: 09/922,902

(22) Filed: Aug. 3, 2001

(51) Int. Cl.[7] .................................................. F21V 9/00
(52) U.S. Cl. ....................... 362/282; 362/269; 362/806; 362/186; 446/485; 446/242
(58) Field of Search ................................. 362/282, 186, 362/253, 809, 269, 280, 806; 446/242, 485

(56) References Cited

U.S. PATENT DOCUMENTS

| | | | | |
|---|---|---|---|---|
| 2,333,475 A | * | 11/1943 | Dupler | 368/23 |
| 2,660,661 A | * | 11/1953 | Dupler | 362/311 |
| 3,049,813 A | * | 8/1962 | List | 434/136 |
| 5,660,463 A | * | 8/1997 | Ho | 362/269 |
| 6,183,257 B1 | * | 2/2001 | Ho | 362/809 |

* cited by examiner

*Primary Examiner*—Stephen Husar
*Assistant Examiner*—Ali Alavi

(57) ABSTRACT

A terrestrial globe has a base seat, a semicircular plate connected to the base seat, and a spherical shell supported by the semicircular plate. The spherical shell has a top aperture and a bottom hole. The base seat has an upper socket. The semicircular plate has a distal post inserted in the top aperture of the spherical shell and a proximal plug having a round hole. A motor has a motor shaft. A pinion receives the motor shaft. A pivot tube is disposed on a positioning seat. A base disk which is disposed on the proximal plug has a center hole and a plurality of oblong holes. A gear has a center aperture and a plurality of upper protruded blocks inserted in the oblong holes of the base disk. The gear which is. inserted in the round hole of the proximal plug engages with the pinion. The pivot tube is inserted through the gear. The positioning seat is disposed on the gear. A collar is inserted in the bottom hole of the spherical shell.

3 Claims, 6 Drawing Sheets

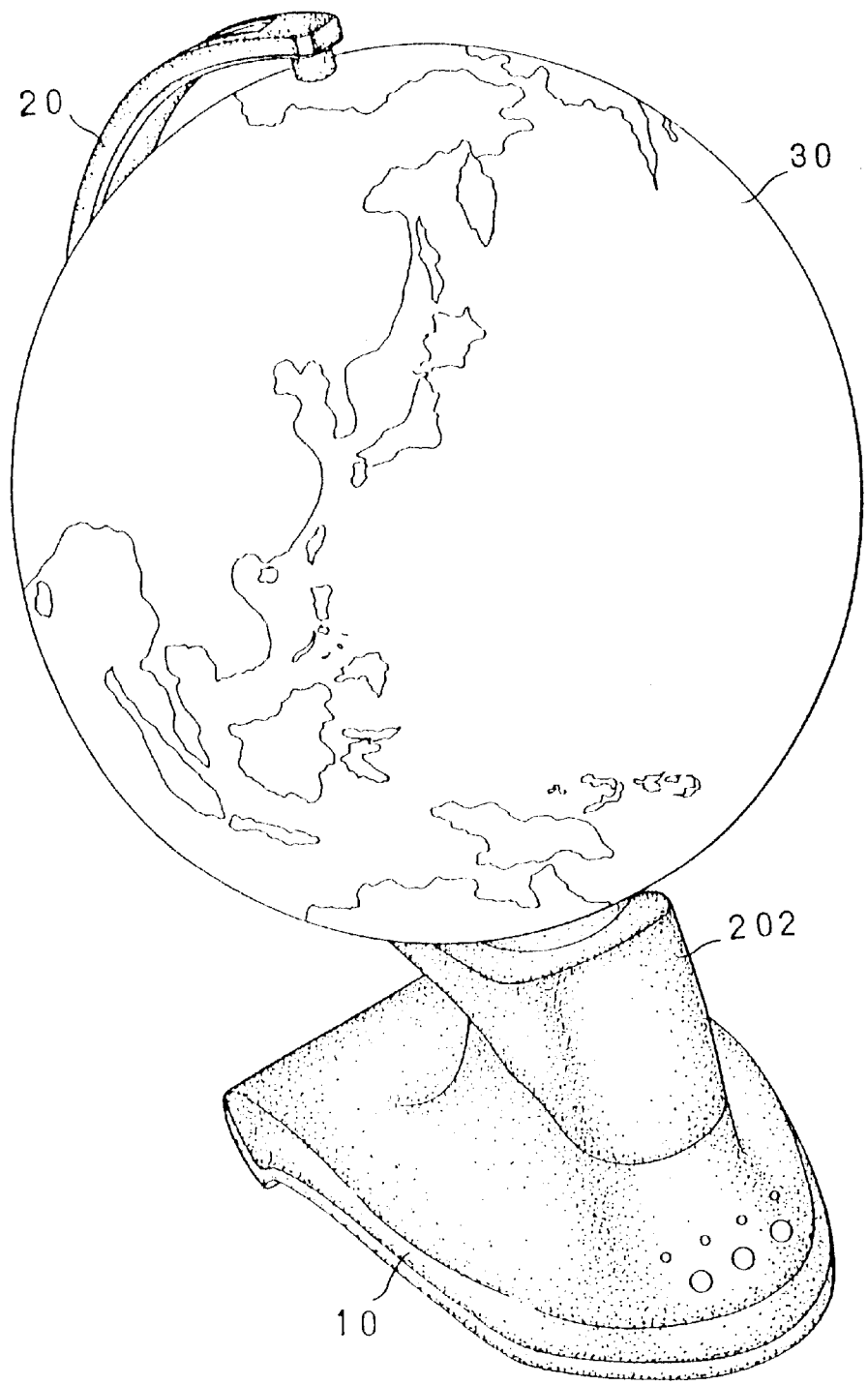
F I G. 1

TERRESTRIAL GLOBE

BACKGROUND OF THE INVENTION

The present invention relates to a terrestrial globe. More particularly, the present invention relates to a terrestrial globe which has a spherical shell to be rotated mechanically.

Referring to FIG. 8, a conventional terrestrial globe has a base seat 1, a semicircular plate 2 disposed on the base seat 1, a main shaft 3 connected to the semicircular plate 2, and a spherical shell 4. The main shaft 3 passes through the spherical shell 4.

SUMMARY OF THE INVENTION

An object of the present invention is to provide a terrestrial globe which has a spherical shell to be rotated mechanically.

Accordingly, a terrestrial globe comprises a base seat, a semicircular plate connected to the base seat, and a spherical shell supported by the semicircular plate. The spherical shell has a top aperture and a bottom hole. The base seat has an upper socket, and a plurality of support plates disposed in the upper socket. The upper socket has a plurality- of through apertures. The semicircular plate has a distal post and- a proximal plug having a round hole and an inner groove. The distal post of the semicircular plate is inserted in the top aperture of the spherical shell. A plurality of connection tubes are disposed in the proximal plug. A plurality of downward pipes are disposed in the proximal plug. A plurality of downward tubes are disposed in the proximal plug. A motor has a motor shaft, a bottom aperture, and two lug bars. Each of the lug bars has a lug hole. A pinion receives the motor shaft. A positioning seat has a plurality of threaded apertures. A pivot tube is disposed on the positioning seat. A base disk is disposed on the proximal plug to match the round hole of the proximal plug. The base disk has a center hole and a plurality of oblong holes. A collar is disposed on the base disk. The proximal plug engages with the upper socket of the base seat. A gear has a center aperture and a plurality of upper protruded blocks inserted in the oblong holes of the base disk. The gear is inserted in the round hole of the proximal plug. The pivot tube is inserted through the gear. The positioning seat is disposed on the gear. The collar is inserted in the bottom hole of the spherical shell. The gear engages with the pinion. A plurality of screws fasten the upper socket and the connection tubes together. A plurality of first bolts fasten the positioning seat and the downward tubes together. A plurality of second bolts fasten the lug bars and the downward pipes together.

BRIEF DESCRIPTION OF THE DRAWINGS

FIG. 1 is a perspective assembly view of a terrestrial globe of a preferred embodiment in accordance with the resent invention;

DETAILED DESCRIPTION OF THE INVENTION

Figure 2:
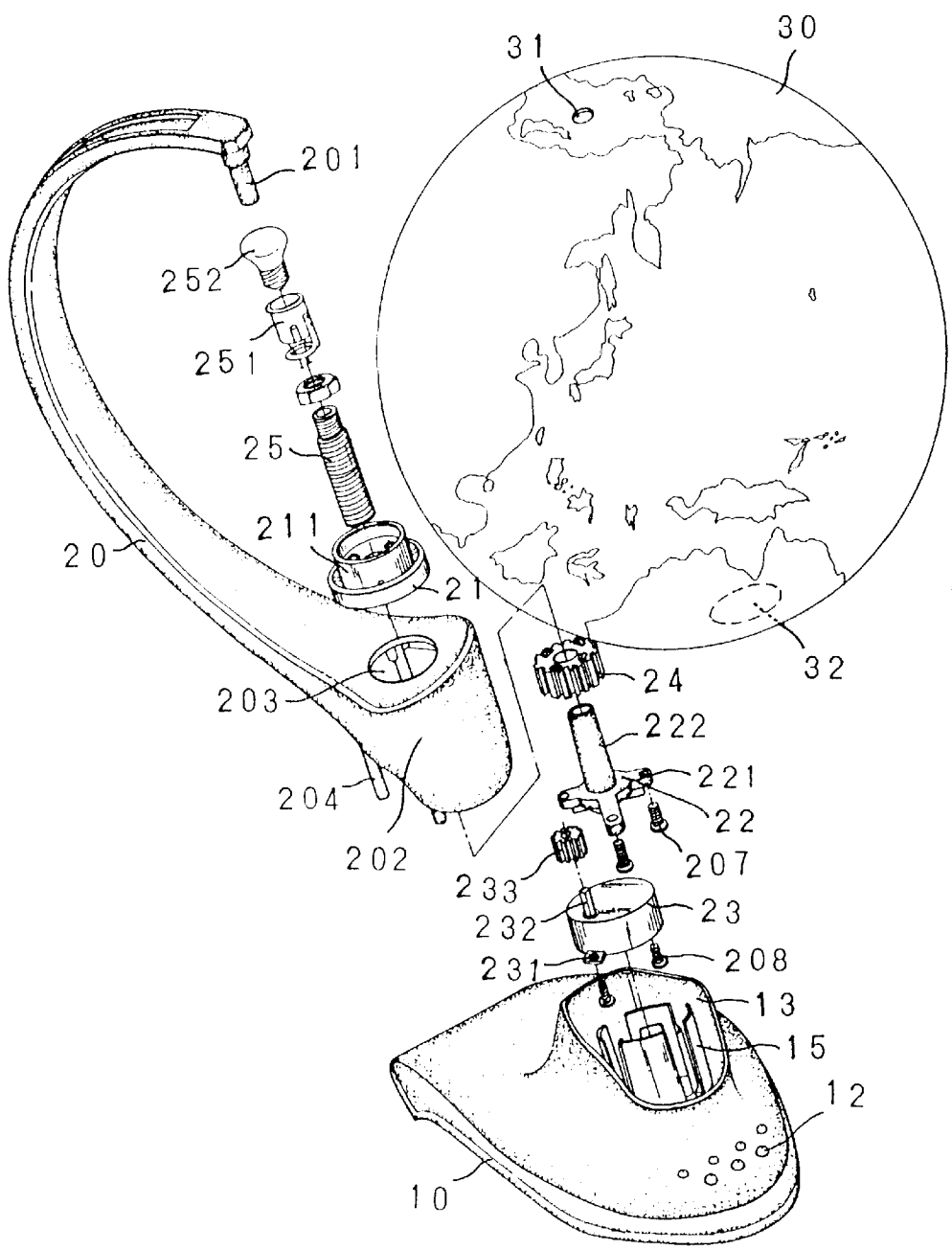
FIG. 2 is a perspective exploded view of a terrestrial globe of a preferred embodiment in accordance with the present invention.
Figure 3:
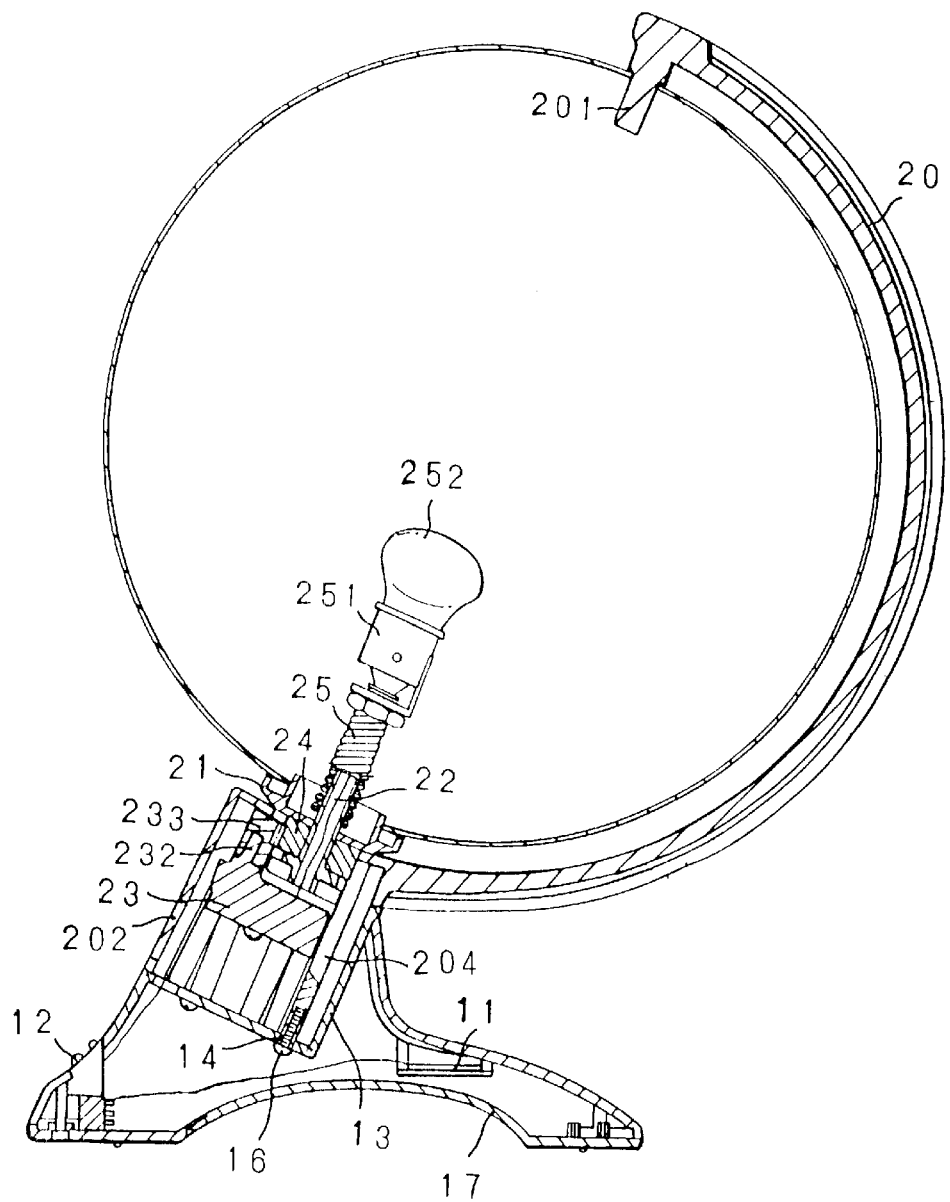
FIG. 3 is a sectional assembly view of a terrestrial globe of a preferred embodiment in accordance with the present invention.
Figure 4:
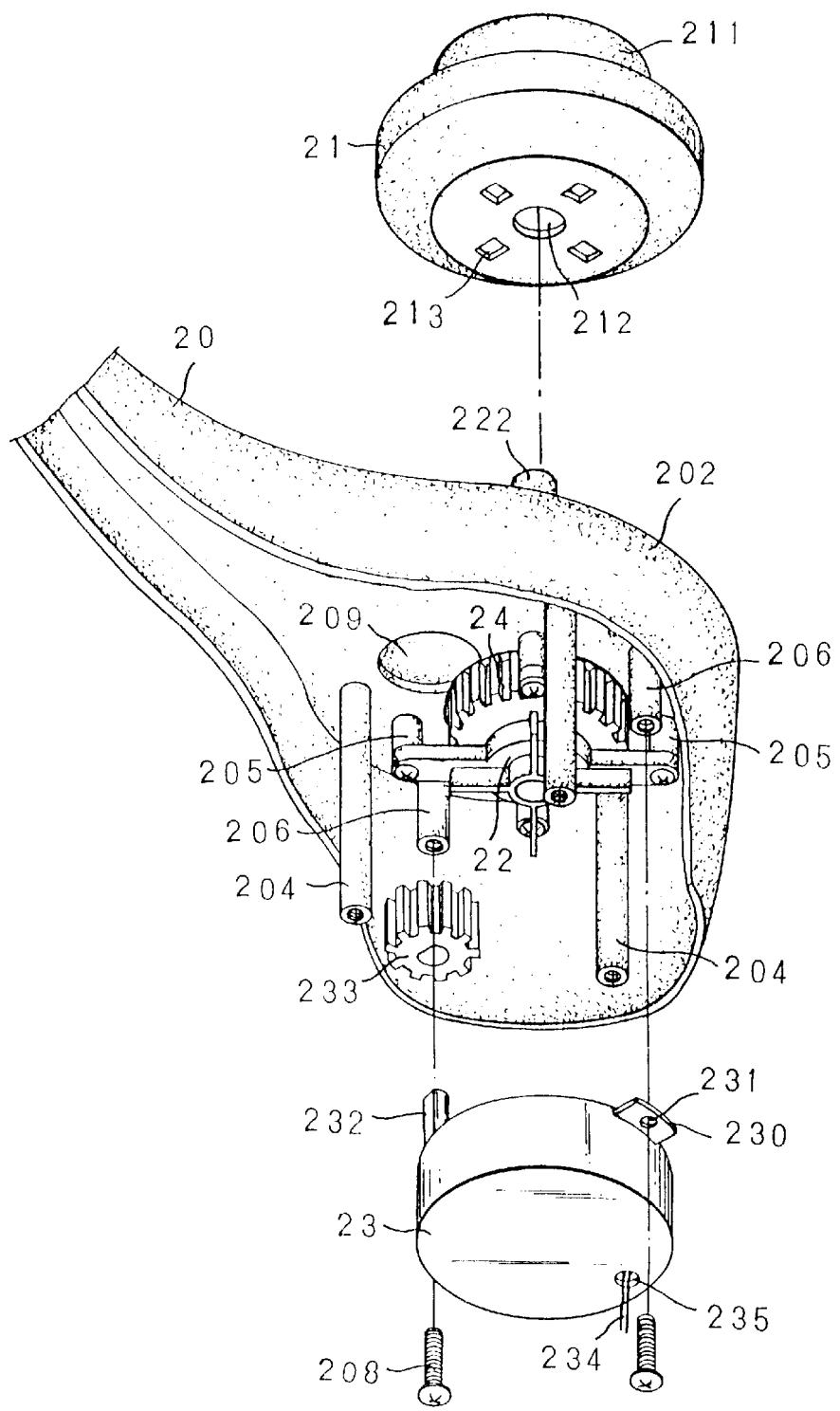
FIG. 4 is a perspective exploded view of a motor, a base disk and a proximal lug of a semicircular plate.
Figure 5:
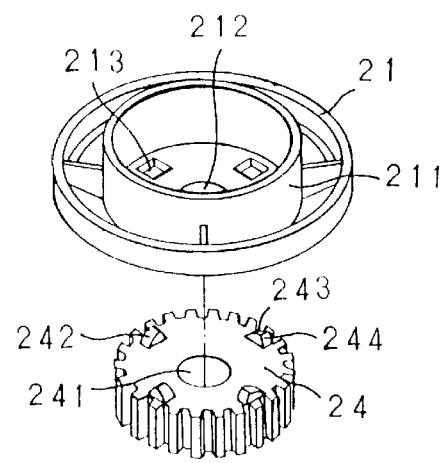
FIG. 5 is a perspective exploded view of a gear and a base disk.
Figure 6:
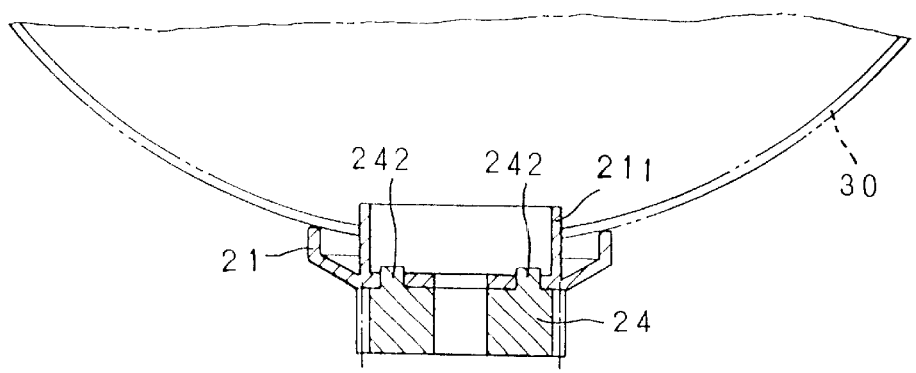
FIG. 6 is a sectional assembly view of a gear and a base disk.
Figure 7:
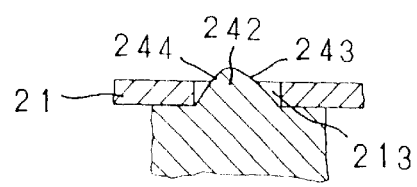
FIG. 7 is a sectional schematic view illustrating a protruded block of a gear inserted in an oblong hole of a base disk.
Figure 8:
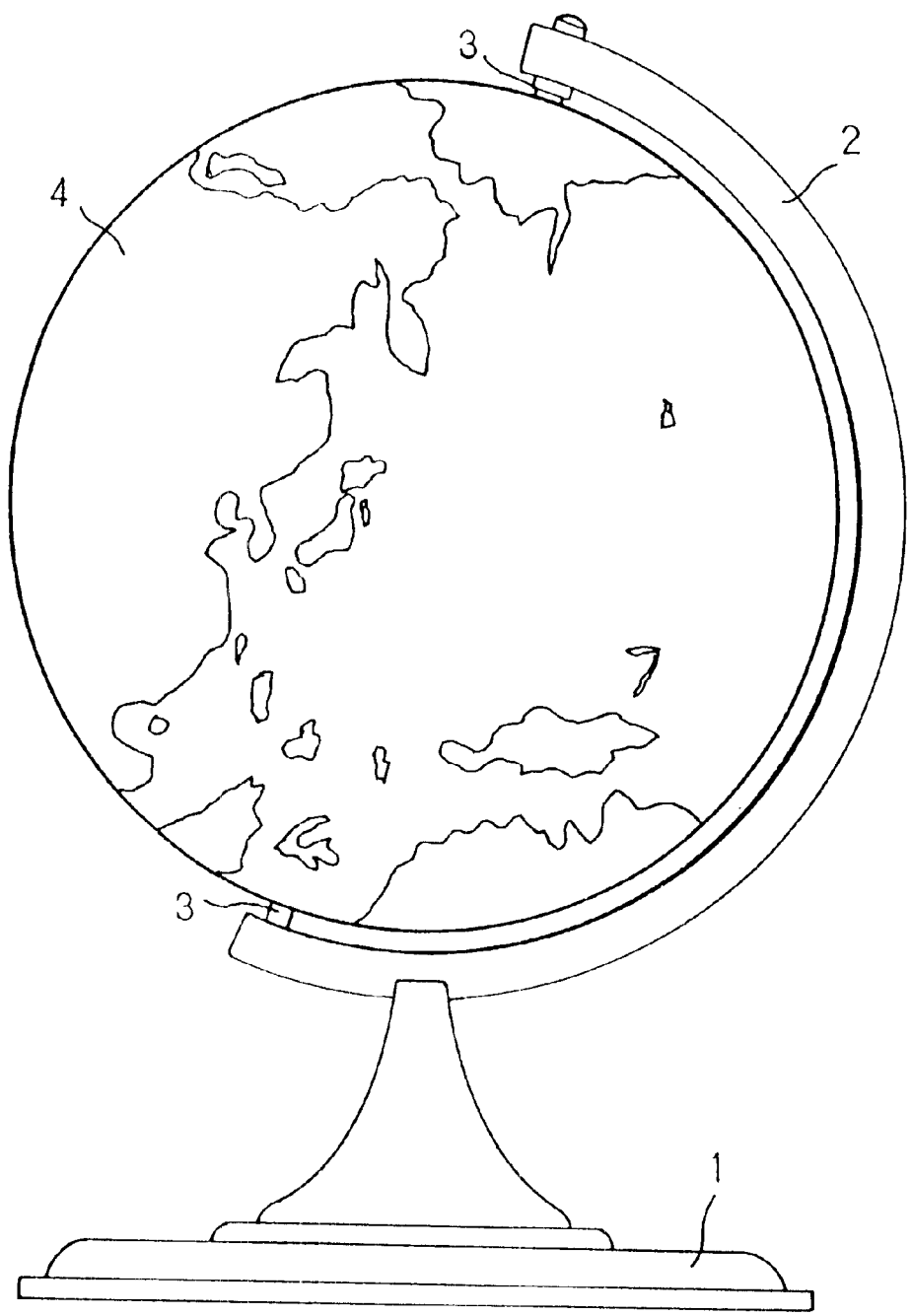
FIG. 8 is a perspective view of a conventional terrestrial globe of the prior art.

Referring to FIGS. 1 to 7, a terrestrial globe comprises a base seat 10, a semicircular plate 20 connected to the base seat 10, and a spherical shell 30 supported by the semicircular plate 20.

The spherical shell 30 has a top aperture 31 and a bottom hole 32.

The base seat 10 has an-upper socket 13, a plurality of support plates 15 disposed in the upper socket 13, a plurality of switches 12, and an incurved bottom 17.

The upper socket 13 has a plurality of through apertures 14.

The semicircular plate 20 has a distal post 201 and a proximal plug 202 having a round hole 203-and an inner groove 209.

The distal post 201 of the semicircular plate 20 is inserted in the top aperture 31 of the spherical shell 30.

A plurality of connection tubes 204 are disposed in the proximal plug 202.

A plurality of downward pipes 206 are disposed in the proximal plug 202.

A plurality of downward tubes 205 are disposed in the proximal plug 202.

A motor 23 has a motor shaft 232, a bottom aperture 235, and two lug bars 230.

Each of the lug bars 230 has a lug hole 231.

A wire 234 passes through the bottom aperture 235 of the motor 23.

A pinion 233 receives the motor shaft 232.

A positioning seat 22 has a plurality of threaded apertures 221.

A pivot tube 222 is disposed on the positioning seat 22.

A base disk 21 is disposed on the proximal plug 202 to match the round hole 203 of the proximal plug 202.

The base disk 21 has a center hole 212 and a plurality of oblong holes 213.

A collar 211 is disposed on the base disk 21.

The proximal plug 202 engages with the upper socket 13 of the base seat 10.

A gear 24 has a center aperture 241 and a plurality of upper protruded blocks 242 inserted in the oblong holes 213 of the base disk 21.

The gear 24 is inserted in the round hole 203 of the proximal plug 202.

The pivot tube 222 is inserted through the gear 24. The positioning seat 22 is disposed on the gear 24.

The collar 211 is inserted in the bottom hole 32 of the spherical shell 30.

The gear 24 engages with the pinion 233.

A plurality of screws 16 fasten the upper socket 13 and the connection tubes 204 together.

A plurality of first bolts 207 fasten the positioning seat 22 and the downward tubes 205 together.

A plurality of second bolts 208 fasten the lug bars 230 and the downward pipes 206 together.

Each of the upper protruded blocks 242 has a first bevel 243 and a second bevel 244. The first bevel 243 has a smooth slope. The second bevel 244 has a sharp slope. When the spherical shell 30 is rotated manually, the upper protruded blocks 242 will not engage with the oblong holes 213 of the base disk 21.

The terrestrial globe. further has a flexible pipe 25, a lamp holder 251, and a bulb 252. The pivot tube 222 is inserted in the flexible pipe 25. The lamp holder 251 is disposed on the flexible pipe 25. The bulb 252 is disposed on the lamp holder 251.

When the motor shaft 232 drives the pinion 233 to rotate, the pinion 233 will drive the gear 24 to rotate. Then the gear 24 drives the base disk 21 to rotate.

An integrated circuit board 11 is disposed in the base seat 10.

The invention is not limited to the above embodiment but various modification thereof may be made. Further, various changes in form and detail may be made without departing from the scope of the invention.

I claim:

1. A terrestrial globe comprises:
   a base seat, a semicircular plate connected to the base seat, and a spherical shell supported by the semicircular plate,
   the spherical shell having a top aperture and a bottom hole,
   the base seat having an upper socket and a plurality of support plates disposed in the upper socket,
   the upper socket having a plurality of through apertures,
   the semicircular plate having a distal post and a proximal plug having a round hole and an inner groove,
   the distal post of the semicircular plate inserted in the top aperture of the spherical shell,
   a plurality of connection tubes disposed in the proximal plug,
   a plurality of downward pipes disposed in the proximal plug,
   a plurality of downward tubes disposed in the proximal plug,
   a motor having a motor shaft, a bottom aperture, and two lug bars,
   each of the lug bars, having a lug hole,
   a pinion receiving the motor shaft,
   a positioning seat having a plurality of threaded apertures,
   a pivot tube disposed on the positioning seat,
   a base disk disposed on the proximal plug to match the round hole of the proximal plug,
   the base disk having a center hole and a plurality of oblong holes,
   a collar disposed on the base disk,
   the proximal plug engaging with the upper socket of the base seat,
   a gear having a center aperture and a plurality of upper protruded blocks inserted in the oblong holes of the base disk,
   the gear inserted in the round hole of the proximal plug,
   the pivot tube inserted through the gear,
   the positioning seat disposed on the gear,
   the collar inserted in the bottom hole of the spherical shell,
   the gear engaging with the pinion,
   a plurality of screws fastening the upper socket and the connection tubes together,
   a plurality of first bolts fastening the positioning seat and the downward tubes together, and
   a plurality of second bolts fastening the lug bars and the downward pipes together.

2. The terrestrial globe as claimed in claim 1, wherein each of the upper protruded blocks has a first bevel and a second bevel.

3. The terrestrial globe as claimed in claim 1, wherein the terrestrial globe further has a flexible pipe, a lamp holder, and a bulb, the pivot tube is inserted in the flexible pipe, the lamp holder is disposed on the flexible pipe, and the bulb is disposed on the lamp holder.

* * * * *